(12) United States Patent
Flower et al.

(10) Patent No.: US 11,929,646 B2
(45) Date of Patent: Mar. 12, 2024

(54) ROTOR FOR AN ELECTRIC MACHINE

(71) Applicant: SAFRAN ELECTRICAL & POWER, Blagnac (FR)

(72) Inventors: Paul David Flower, Buckinghamshire (GB); Anthony Kelly, Buckinghamshire (GB)

(73) Assignee: SAFRAN ELECTRICAL & POWER, Blagnac (FR)

( * ) Notice: Subject to any disclaimer, the term of this patent is extended or adjusted under 35 U.S.C. 154(b) by 340 days.

(21) Appl. No.: 17/413,095

(22) PCT Filed: Dec. 11, 2019

(86) PCT No.: PCT/EP2019/084700
§ 371 (c)(1),
(2) Date: Jun. 11, 2021

(87) PCT Pub. No.: WO2020/120599
PCT Pub. Date: Jun. 18, 2020

(65) Prior Publication Data
US 2022/0014054 A1     Jan. 13, 2022

(30) Foreign Application Priority Data

Dec. 14, 2018    (GB) ..................................... 1820467

(51) Int. Cl.
*H02K 1/24*        (2006.01)
*B64D 27/24*     (2006.01)
(Continued)

(52) U.S. Cl.
CPC ............. *H02K 1/246* (2013.01); *B64D 27/24* (2013.01); *H02K 1/02* (2013.01); *H02K 15/022* (2013.01)

(58) Field of Classification Search
CPC ........ H02K 1/246; H02K 1/02; H02K 15/022; B64D 27/24
(Continued)

(56) References Cited

U.S. PATENT DOCUMENTS 4,024,628 A      5/1977   Crites
7,875,823 B1 *  1/2011   Dowd ..................... F16C 3/023
                                                                   29/DIG. 13
(Continued)

FOREIGN PATENT DOCUMENTS

CN     108832739 A    11/2018
CN     110474498 A    11/2019
(Continued)

OTHER PUBLICATIONS

Great Britain Search Report, GB1820467.7 dated Jun. 4, 2019, 5 pages.
(Continued)

*Primary Examiner* — Terrance L Kenerly
(74) *Attorney, Agent, or Firm* — Rankin, Hill & Clark LLP

(57) ABSTRACT

The present invention relates to a rotor of an electric machine for use in an aircraft. By forming the shaft of the rotor such that it performs, at least partially, the function of the back iron, components of the rotor can be combined. Further, by forming the rotor components in this manner, an internal shaft with an increased diameter can be used to provide a rotor with greater stiffness than equivalent prior art devices.

18 Claims, 7 Drawing Sheets

(51) Int. Cl.
    *H02K 1/02*        (2006.01)
    *H02K 15/02*      (2006.01)

(58) Field of Classification Search
    USPC .................................... 310/216.001, 216.091
    See application file for complete search history.

(56) References Cited

U.S. PATENT DOCUMENTS

| | | |
|---|---|---|
| 2013/0221771 A1 | 8/2013 | Kono et al. |
| 2014/0333174 A1 | 11/2014 | Imura et al. |
| 2017/0047795 A1 | 2/2017 | Klassen |
| 2019/0348894 A1* | 11/2019 | Huang ..................... H02K 1/24 |

FOREIGN PATENT DOCUMENTS

| | | |
|---|---|---|
| EP | 3211764 A1 | 8/2017 |
| EP | 3232539 A1 | 10/2017 |
| EP | 3567706 A1 | 11/2019 |
| WO | 2017/148549 A1 | 9/2017 |

OTHER PUBLICATIONS

International Search Report and Written Opinion, PCT/EP2019/084700, dated May 3, 2020, 12 pages.
Marcin Wardach, "Design of Hybrid Excited Claw Pole Machine with Laminated Rotor Structure", 2018 Innovative Materials and Technologies in Electrical Engineering, Apr. 18, 2018, 4 pages.
Great Britain Examination Report dated Oct. 18, 2022, Application No. GB 1820467.7, 3 pages.
Chinese Office Action Corresponding to CN 201980081307.X, dated Aug. 26, 2023, 5 pages.

\* cited by examiner

ROTOR FOR AN ELECTRIC MACHINE

FIELD OF THE INVENTION

Embodiments of the present invention relate generally to an electric machine for use in an aircraft engine. More specifically they relate to a rotor of an electric machine in which the rotor shaft forms at least part of the back iron of the rotor.

BACKGROUND OF THE INVENTION

In the field of motors, generators and starter generators (collectively referred to as 'electric machines'), advancements in the designs of these devices often relate to increases in structural rigidity and reductions in weight. The electrical frequency is a function of the rotational speed multiplied by the number of poles of the machine. Therefore, electric machines with a higher number of poles can rotate at lower speeds in order to output a comparable frequency to an electric machine with fewer poles. However, in general, the higher the number of poles an electric machine has, the more mass it has which is dedicated to non-active electromagnet parts. For aircraft, the typical accepted electrical frequency for a Variable Frequency Generator (VFG) is 400 Hz to 800 Hz. Relative to 4-pole generators, 6-pole generators rotate at a slower speed for a given electrical frequency and, as such, are not required to be as strong and/or stiff as 4-pole generators, which must have high stiffness in order to cope with high vibration frequencies.

In order to provide an acceptably stiff rotor for use instead of 6-pole VFGS, 4-pole VFGs commonly use a structural element of the rotor located externally to the magnetic core and windings of the rotor. In this manner, the external element (also referred to as a 'sleeve' or 'can') encloses the rotor core pack and is used to prevent structural deterioration of the rotor assembly, in terms of structural stiffness, as well as acting to hinder deformation of winding of the core pack under high centrifugal forces. However, for a given electric machine size, the smaller the airgap between the rotor and the stator (i.e., the magnetic air gap), the higher the torque achieved by that electric machine. As such, electric machines equipped with cans tend to output a smaller torque than comparable electric machines without a can about the rotor.

A further problem when designing electric machines is that the bonded laminations of the rotor have a very limited structural strength in the longitudinal direction due to relative weaknesses in the bonds between layers. Although it is possible to use alternative fixing means, such as welding, this often avoided in order to avoid introducing eddy currents between laminations and changing the magnetic and mechanical properties of the laminations.

Embodiments of the present invention aim to overcome the problems found in prior art systems.

SUMMARY OF THE INVENTION

In a 4-pole design, the available space through the centre of the rotor for an internal shaft is very limited, which makes designing a very stiff internal shaft extremely challenging. Since the resonant speed of the rotor varies with $$\sqrt{\frac{stiffness}{mass}},$$

this has tended to mean that small or slow turning (i.e. 6-pole) rotors with an internal shaft have been considered feasible, but large 4-pole rotors have been beyond the state of the art.

Embodiments of the present invention aim to overcome these problems by providing a system which uses the magnetic material of the rotor in a structural manner, increasing the rotor stiffness and removing the requirement to fit a structural shaft inside the internal diameter of the lamination pack. This can be particularly beneficial in a 4-pole rotor design. By forming the shaft from a material with a high saturation magnetic flux density, it is able to form a part of the back iron which enables magnetic flux to flow between poles of the core pack. A combined shaft/back iron enables better use of space within the rotor, thus increasing the power density of the device. The smaller inner diameter at the centre of the core rotor enables a smaller outer diameter, and therefore overall size and weight, for the same torque output.

In order to solve the problems associated with the prior art, the present invention provides an electric machine for use in an aircraft. The electric machine comprises a stator and a rotor, rotatably journaled to rotate about a rotation axis within the stator. The rotor comprises a shaft portion, a core pack portion and a back iron portion. The core pack portion comprises a plurality of poles disposed around the shaft portion. The back iron portion is configured to provide a path for magnetic flux to flow between adjacent poles of the core pack portion. The back iron portion is at least partially formed by the shaft portion. The shaft portion also comprises at least one shaft end which extends axially beyond the core pack portion. The shaft portion, the core pack portion and the back iron portion comprise a soft magnetic material.

As will be appreciated, the present invention provides several advantages over the prior art. For example, by integrating the shaft portion and the back iron portion into a single unit, the back iron portion itself provides the required structural stiffness, thus removing the need for a separate shaft internal to the core pack portion of the rotor. Further, by forming the shaft from the same type of material as the core pack portion of the rotor, it is possible to simplify the process for manufacturing the rotor. For example, in prior art systems, the back iron and shaft would be formed separately from each other before being brought together to form the rotor. By forming these pieces from the same material, it becomes possible and practical to form them together.

The shaft portion, the core pack portion and the back iron portion may each comprise a material with a saturation magnetic flux density greater than 1.6 T, 1.65 T, 1.7 T, 1.75 T, 1.8 T, 1.85 T, 1.9 T, 1.95 T or 2 T (tesla). This provides the advantage of enabling sufficient magnetic flux to flow through the shaft portion.

The shaft portion may be hollow tube comprising an internal diameter and an external diameter. The internal diameter of the shaft portion may be reduced in a back iron region which is longitudinally aligned, along the rotation axis, with the core pack portion. The back iron region may be of substantially equal axial length to the core pack portion. An interface between the reduced internal diameter of the back iron region and a region of increased internal diameter may be chamfered. The internal diameter of the shaft portion at the at least one shaft end may be increased relative to the internal diameter in a region of the core portion. These features provide improvements to the stiffness of the rotor.

The shaft portion, the core pack portion and the back iron portion may be a unitary part. This provides the advantage of significantly simplifying the manufacturing process and further increasing stiffness due to a reduced number of joins.

The shaft portion, the core pack portion and the back iron portion may be formed of two or more separate parts. This provides the advantage of enabling alternative manufacturing methods to be used.

At least one of the shaft portion, the core pack portion and the back iron portion may be made from Cobalt Iron. This provides the advantage of a high magnetic saturation flux density in those portions of the rotor.

Each of the plurality of poles may comprise a chamfered edge at a base of the pole and between respective poles. This increases the strength of the pole.

In a second aspect of the invention, there is provided a method of manufacturing a rotor for an electric machine for use in an aircraft. The method comprising the steps of: providing a shaft portion; providing a core pack portion, comprising a plurality of poles; providing a back iron portion; and assembling the rotor such that the core pack portion and the back iron portion are disposed around the shaft portion, and the back iron portion and the shaft portion provide a path for magnetic flux to flow between adjacent poles of the core pack portion. Each of the shaft portion, the core pack portion and the back iron portion comprise a soft magnetic material.

In a third aspect of the invention, there is provided a method of manufacturing a rotor for an electric machine for use in an aircraft, the method comprising the steps of: providing a unitary soft magnetic material having a core pack portion with a first external diameter and a shaft end portion with a second external diameter, the first external diameter being greater than the second external diameter; and providing at least one rotor feature by performing a material removal process upon the unitary material.

The method may further comprise performing a material removal process upon the unitary material such that the material, in at least a part of the shaft end portion, is shaped as a hollow tube with an internal diameter.

The method may further comprise making the internal diameter at the shaft end portion greater than the internal diameter at the core pack portion.

The method may further comprise performing a material removal process upon the unitary material in order to form a chamfer at a boundary between the first external diameter and the second external diameter.

The method may further comprise performing a material removal process upon the core pack portion to define a plurality of poles, each pole comprising a pole tip and, preferably, a pole tip overhang.

The method may further comprise performing a material removal process upon the core pack portion in order to form an attachment portion between adjacent poles.

BRIEF DESCRIPTION OF THE DRAWINGS

Other advantages and benefits of embodiments of the present invention will become apparent from a consideration of the following description and accompanying drawings, in which.

DETAILED DESCRIPTION OF EXEMPLARY EMBODIMENTS

Figure 1B:
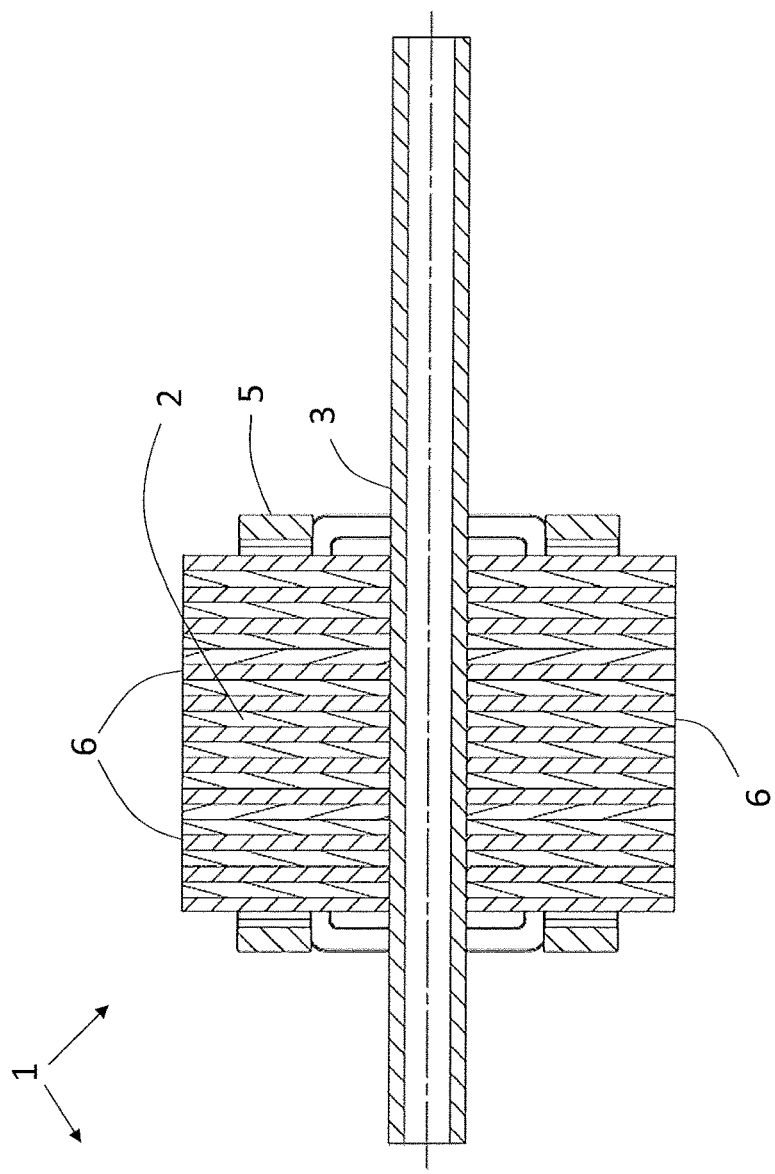
FIGS. 1a and 1b show an example of the prior art in which a conventional laminated rotor is mounted on a separate structural shaft.
Figure 1A:
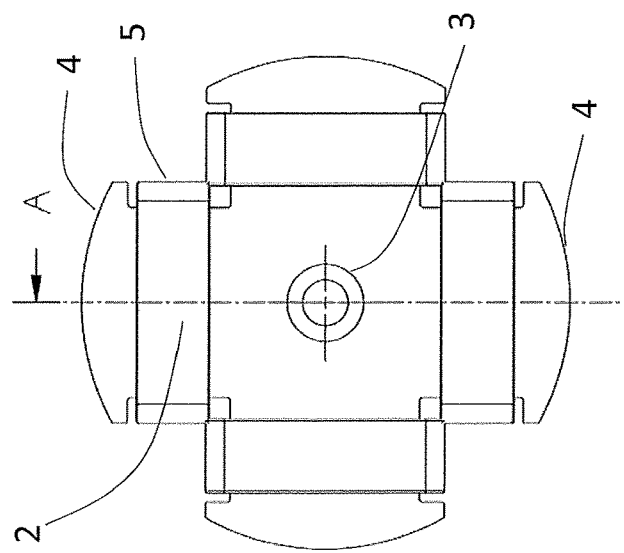

FIGS. 1a and 1b show a 4-pole rotor 1 of the prior art, wherein a rotor core 2 is mounted onto an internal shaft 3. The rotor core 2 comprises a plurality of poles 4, around which windings 5 are wound. The rotor core 2 is formed by a plurality of laminations 6. The laminations 6 are glued, bonded, or otherwise held together to form a solid structure about the shaft 3. Each of the laminations 6 of the rotor core 2 are made of a soft magnetic material in order to enable magnetic flux to flow through the rotor core 2. The shaft 3 comprises a structurally rigid material, such as carbon steel.

Due to the high mechanical stresses upon the rotor 1 when in use within an electric machine, the rotor 1 needs to have sufficient structural stiffness. In the prior art device of FIGS. 1a and 1b, this is achieved by using a steel shaft, to which the rotor core laminations 6 are attached. However, due to the small diameter of the shaft 3, the stiffness provided by the shaft 3 is limited. As such, 4-pole rotors of this type are generally used in low frequency environments.

Figures 2A, 2B:
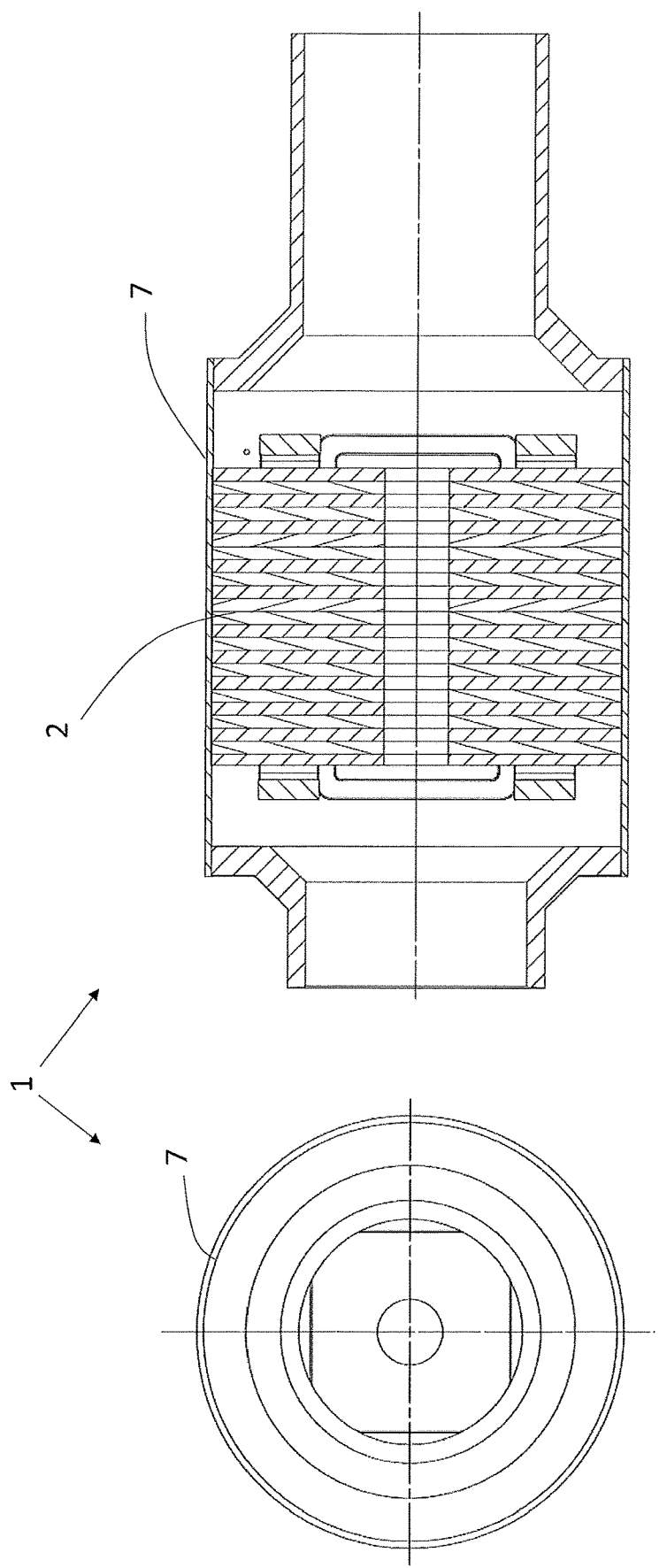
FIGS. 2a and 2b show a further example of the prior art in which a conventional laminated rotor is mounted inside a structural sleeve/can.

FIGS. 2a and 2b show a further 4-pole rotor 1 of the prior art, however, in this example, instead of an internal shaft 3, the structural integrity of the rotor is provided by an external structural sleeve 7 (also referred to as a can), which encloses the rotor core 2. The external sleeve 7 provides increased stiffness to the rotor 2, by providing additional structural support to the laminations 6.

Rotors 1 of the type shown in FIGS. 2a and 2b can be acceptable for Variable Frequency Generators (VFGs) in which the external sleeve 7 fits within the air gap between the rotor 1 and the stator without unacceptable detriment to the performance of the generator. However, Variable Frequency Starter Generators (VFSGs) require a much smaller air gap in order to obtain the desirable starting torque. As such, an external sleeve 7 is not viable. This is because the can 7, for reasons of structural performance, is made from materials with limited or substantially zero magnetic permeance, such as Inconel®, stainless steel, or composite materials, such as carbon fibre composite. The thickness of the sleeve therefore effectively contributes to the effective magnetic air-gap between the rotor and stator. When combined with the actual clearance required between stator and rotor, this can mean the effective combined airgap, of sleeve thickness plus clearance, is too great for sufficient starter mode performance (torque) of the electric machine.

In light of the above, for VFSGs, it is common to forgo a 4-pole rotor design for heavier 6-pole rotors. 6-pole rotors are required to rotate at a lower speed to achieve a comparable electrical frequency to a 4-pole rotor. Further, due to the manner in which 6-pole rotors are designed, there is generally more space available at the centre of the rotor for a larger, stiffer shaft. In light of the above, there is a desire for 4-pole rotors which are capable of being used in high frequency environments.

A rotor 1 in accordance with exemplary embodiments of the present invention is shown in FIGS. 3a to 7.

Figure 3B:
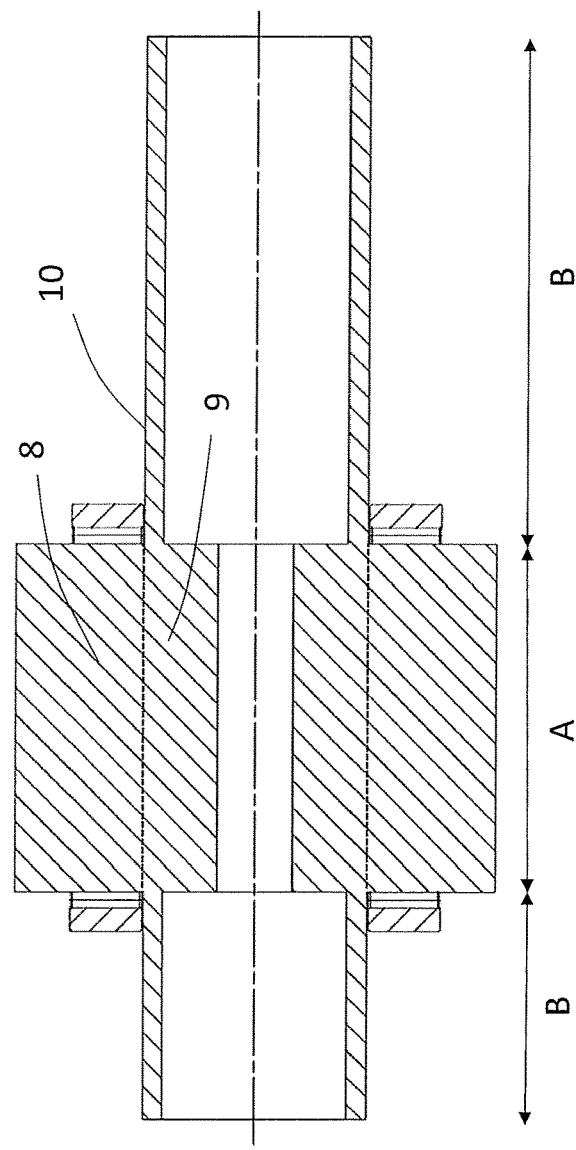
FIGS. 3a and 3b show an embodiment of the invention in which the solid rotor core and shaft form a monolithic structure formed from a single unitary piece of material.
Figure 3A:
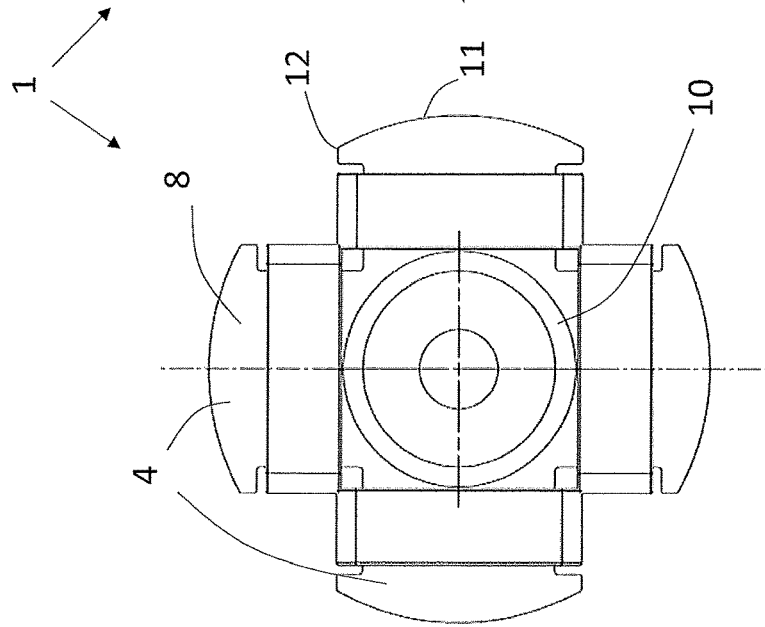

FIGS. 3a and 3b show an embodiment of the invention in which a rotor 1 comprises a core pack portion 8, a back iron portion 9 and a shaft portion 10.

The shaft portion 10 has one or more shaft ends which extend axially beyond the core pack portion. In this manner, the shaft portion 10 is a unitary piece of material which extends through the centre of rotation of the core pack portion 8.

The core pack portion 8 of the rotor 1 comprises a plurality of poles 4 disposed around the shaft portion 10. Each of the poles 4 are connected such that they are magnetically coupled through the back iron portion 9, located at the root of the poles 4. The back iron portion 9 enables magnetic flux to flow between adjacent poles 4 of the core pack portion 8, such that a substantial part of the magnetic flux conduction between adjacent poles is conducted via the back iron. In essence, the back iron portion 9 acts as a region of preferred magnetic flux flow between poles 4.

As in the prior art, the poles 4 of the core pack portion 8 are arranged to receive windings 5, which are wound around each pole 4. A pole tip 11, at the end of each pole 4, acts as a magnetic interface between the rotor 1 and the stator of the electric machine. A pole tip overhang 12, acts to at least partially retain the windings 5 on the pole 4 during use, to resist centrifugal forces generated in rotation of the rotor.

The shaft portion 10 enables the rotor 1 to be at least journaled for rotation with an electric machine assembly, and preferably allows the rotor 1 to be coupled to an external mechanism arranged as an input or an output for the electric machine, depending as required by the machine's chosen function.

In the embodiment of the invention shown in FIGS. 3a and 3b, the core pack portion 8, the back iron portion 9 and the shaft portion 10 are all formed of a unitary piece of soft magnetic material. By forming the rotor 1 from a single piece of material, the back iron portion 9 and the shaft portion 10 can be arranged such that their functions overlap. In this manner, the shaft portion 10 forms at least a part of the back iron portion 9, such that the back iron portion 9 extends within the bore of the shaft portion 10. This enables magnetic flux present within a first pole 4 to travel through the combined shaft/back iron portion into an adjacent pole 4.

By combining the functions of the back iron portion 9 and the shaft portion 10, it is possible to increase the diameter of the shaft portion 10 at regions away from the core pack portion 8. For example, as shown in FIG. 3b, the inner diameter of the shaft portion 10 in the region which lies within the core pack portion 8 (region A) is similar to that of the prior art shown in FIGS. 1a and 1b. However, in contrast to the prior art embodiment of FIGS. 1a and 1b, away from the core pack portion 8 (region B), the inner diameter of the shaft portion 10 is larger than it is at the region within the core pack portion 8 (region A). By using an increased diameter of the shaft portion 10 away from the core pack portion 8, the stiffness of the rotor 1 as a whole can be increased.

As can be seen with reference to FIGS. 2a and 2b, some prior art systems are capable of achieving a large shaft diameter away from the core pack region. However, as discussed above, this is only known in combination with an external sleeve arrangement, which is generally not suitable for providing the necessary air gap of a VFSG. In these prior art systems, the sleeve does not form part of the back iron portion.

A further advantage provided by the embodiment of present invention shown in FIGS. 3a and 3b is the simplification of the manufacturing process. By forming the rotor 1 from a single piece of material, the rotor 1 can be formed by, for example, hot forging. Forming the rotor 1 in this manner is significantly cheaper and simpler than presently used methods.

Further, by forming the rotor 1 from a single piece of soft magnetic material, there is no need for joins between separate portions of the rotor 1. As such, there are fewer weaknesses in the rotor 1, leading to a stiffer device.

The material used to form the rotor 1 must be magnetic, with a high saturation magnetic flux density, such that the rotor 1 is capable of performing its primary function of facilitating sufficient magnetic flux flow. Typical stainless steel shaft components generally have a saturation magnetic flux density of around 1.6 T (tesla), since they have a relatively high chromium content. In this manner, the saturation magnetic flux density of the rotor material of the present invention is at least greater than 1.6 T, 1.65 T, 1.7 T or 1.75 T. However, in some examples, saturation magnetic flux densities of below 1.8 T may not be high enough to facilitate sufficient magnetic flux flow. As such, the saturation magnetic flux density is preferably at least greater than 1.8 T, 1.85 T 1.9 T or 1.95 T. Although materials with higher saturation magnetic flux densities are less common, it is even more preferable that the saturation magnetic flux density is greater than 2.0 T (tesla). The material used to form the rotor 1 should preferably have a stiffness equivalent to that of stainless steel, which is typically used to provide the shaft 3 of prior art rotors 1. The material should also preferably be a soft magnetic material, in that it is easily magnetisable and demagnetisable. An example of a material which meets the above requirements is Cobalt Iron (CoFe). Another example is Cobalt Iron Vanadium (CoFeV). Most Cobalt alloys contain at least some Vanadium and some other trace elements too. As an example, one alloy used in implementing the present invention contained 49% Cobalt, 49% Iron, 2% Vanadium and several other trace elements. However, it will be clear to the skilled person, in light of the present disclosure, that other such materials are readily available and could also be used for the present invention.

In general, prior art systems form the rotor core pack from a series of laminations 6 in order to avoid eddy current losses. By connecting laminations together using non-conductive materials, eddy currents between laminations are negated. Eddy current losses are a result of AC components of the current within the device. In light of this, in practice, the majority of eddy current losses would occur within the stator. The windings of the rotor 1 use currents which are DC in nature and, as such, eddy currents are significantly less prominent (although AC components do occur at the outer diameter of the rotor 1 as it passes the stator windings). In light of this, although it may be considered that forming the rotor 1 from a unitary material would introduce some eddy current losses, in practice, these losses have been found to be minimal in the present embodiments.

Figures 4A, 4B:
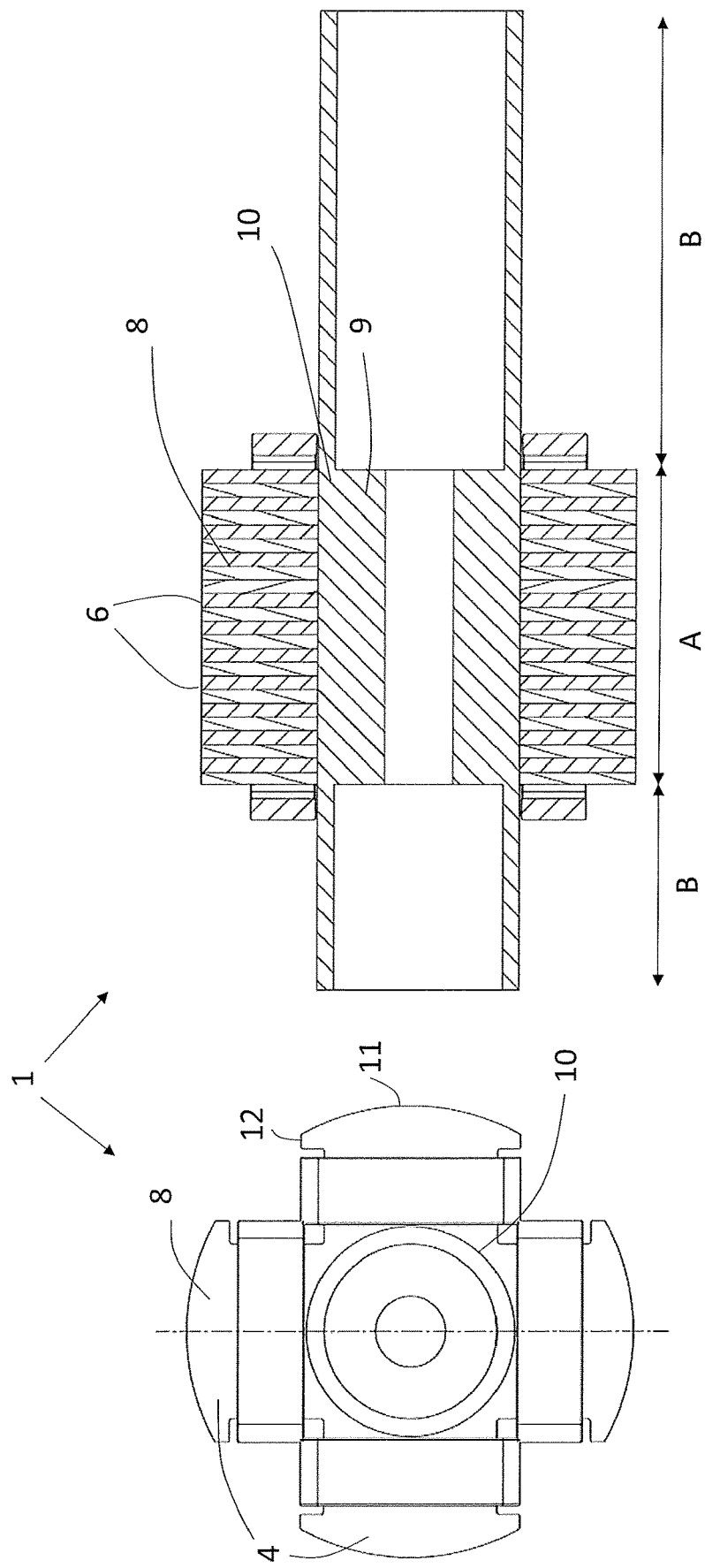
FIGS. 4a and 4b show an embodiment of the invention in which a laminated rotor core is mounted on a combined shaft and back iron structure.

Another embodiment of the present invention is shown in FIGS. 4a and 4b. The embodiment of FIGS. 4a and 4b is similar to that of the embodiment shown in FIGS. 3a and 3b. However, in this embodiment, the core pack portion 8 comprises a plurality of laminations 6. The laminations 6 of this embodiment may be formed and held together using conventional means, such as bonding or gluing. As set out above, by using laminations 6 for the core pack portion 8, eddy current losses are minimised.

In a similar manner to that of the embodiment of FIGS. 3a and 3b, the shaft portion 10 and the back iron portion 9 are formed of a single piece of material. Each of the core pack portion 8, the back iron portion 9 and the shaft portion 10 are formed of a material with a high magnetic flux density, preferably higher than 2 T. In a similar manner to the embodiment of FIGS. 3a and 3b, example materials for forming the core pack portion 8, back iron portion 9 and shaft portion 10 are CoFe and CoFeV. However, other materials with similar stiffness and magnetic characteristics can also be used.

The laminations 6 of the core pack portion 8 are attached to the combined shaft/back iron portion in order to form the rotor 1. By attaching the core pack portion 8 to the shaft/back iron portion, magnetic flux can flow between poles 4 of the core pack portion 8 via the shaft/back iron portion.

In a preferred embodiment, the laminations 6 are attached to the shaft/back iron portion using an interference fit. For example, the laminations 6 are heated such that they expand and are then located around the shaft/back iron portion and allowed to cool. Further, the shaft/back iron portion can be cooled, in order to cause it to shrink, in advance of the laminations 6 being located around the shaft/back iron portion. Alternative methods of attaching the laminations 6 to the shaft/back iron portion include welding and attachment by screw threads.

As with the embodiment of FIGS. 3a and 3b, the inner diameter of the shaft portion 10 is smaller at a region aligned with the core pack portion 8 (region A). At regions not aligned with the core pack portion 8 (region B), the inner diameter is larger, thus increasing the stiffness of the rotor 1.

Figure 5B:
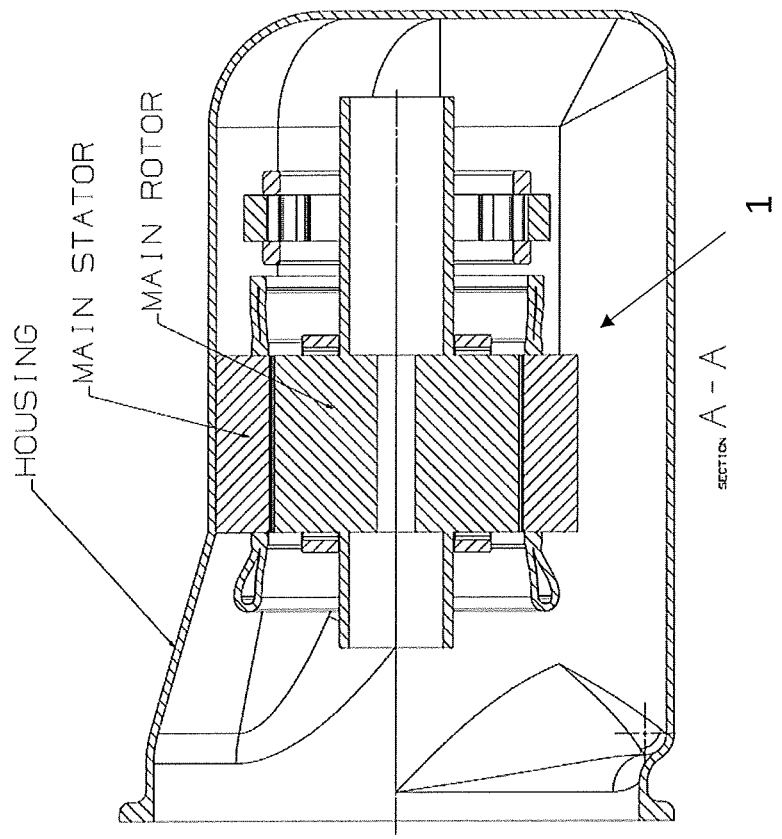
FIGS. 5a and 5b show an embodiment of the invention in which an electric machine comprising a rotor and a stator is mounted in a housing.
Figure 5A:
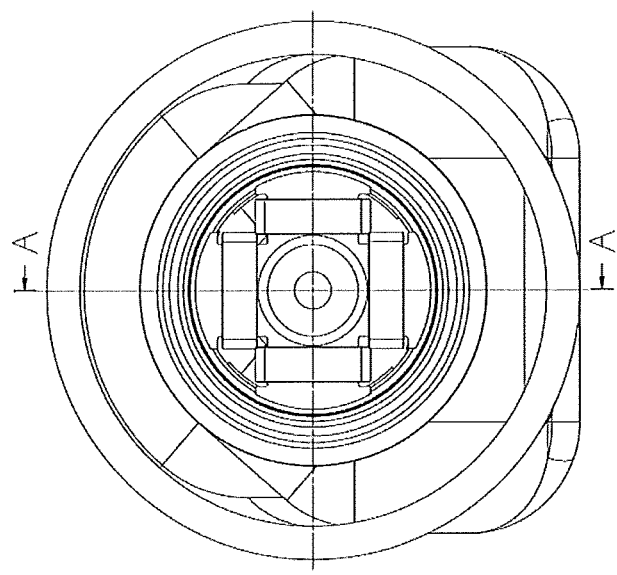

With reference to FIGS. 5a and 5b, there is provided an embodiment in which an electric machine of the present invention is located within a housing. The rotor 1 is journaled within a stator. The stator is attached to the inside of the housing.

Although the embodiment shown in FIGS. 5a and 5b depicts a rotor 1 with a unitary material arrangement (as shown in FIGS. 3a and 3b), it is to be understood that a rotor 1 according to any embodiment of the invention may be used.

Figure 6:
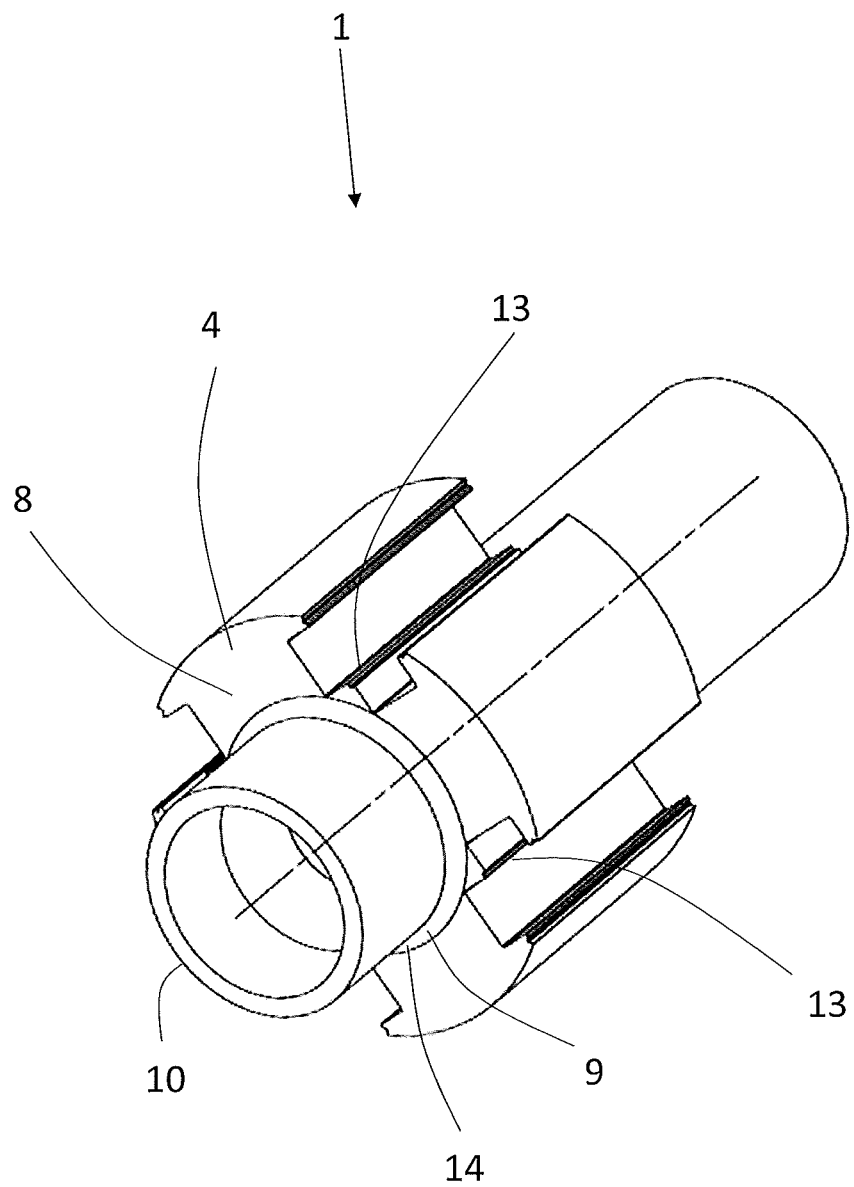
FIG. 6 shows an embodiment of the invention in which attachment portions are located between poles of the rotor core.

With reference to FIG. 6, there is shown an alternative view of the embodiment described with relation to FIGS. 3a and 3b. In this regard, the core pack portion 8, the back iron portion 9 and the shaft portion 10 are formed of a unitary piece of material, such as CoFe or CoFeV.

In forming the rotor 1 of a unitary piece of material, it is further possible to introduce useful features which are difficult to introduce when using a laminated core pack structure. For example, as shown in FIG. 6, in using a unitary material, it is possible to form attachment portions 13 between respective poles 4 of the core pack portion 8. In this manner, after a winding 5 has been placed around a pole 4, a wedge-shaped piece of material and be attached to the attachment portion 13 in order to hold the windings 5 in position.

As will be understood, when using a laminated core pack, it is more difficult to attach components to the core pack without degrading its structure.

Figure 7:
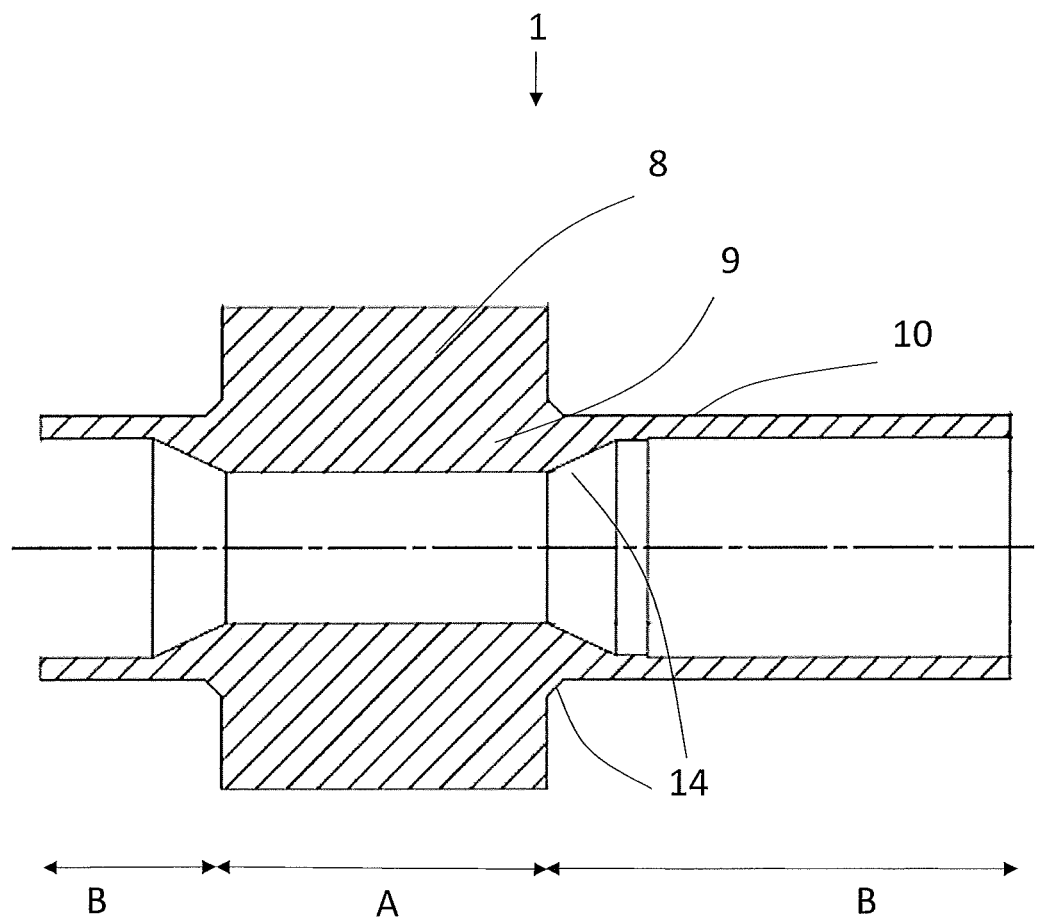
FIG. 7 shows an embodiment of the invention in which interfaces between regions of the rotor are chamfered.

With reference to FIG. 7, there is shown a sectional view of an embodiment of the present invention. In this embodiment, as with the embodiments of FIGS. 3a, 3b, 5 and 6, the core pack portion 8, back iron portion 9 and the shaft portion 10 are formed from a unitary piece of material.

Further structural advantages may be gained by introducing chamfered (sloped) interfaces 14 between portions of the structure.

For example, at an interface between the core pack portion 8 and the external face of the shaft portion 10, a chamfered or sloped edge 14 acts to increase the stiffness of the rotor structure.

As a further example, a chamfered/sloped interface 14 along the inner diameter of the shaft portion 10 also increases the stiffness and/or fatigue life of the rotor 1, primarily by avoiding stress concentrations at any abrupt changes in the profile of the cross section in the material. Such an interface is preferably located between smaller and larger inner diameter regions (regions A and B) discussed above with reference to FIGS. 3a and 3b.

As set out above, by forming parts of the rotor 1 from a unitary piece of material, the manufacturing process for forming these parts is significantly simplified and costs can be saved.

For example, starting with a simple bar of Cobalt Iron, the manufacturing process may simply require the removal of material in order to form the rotor 1. Although this method tends to lead to large amounts of waste material, this can still be an effective manufacturing method.

Cost savings and reduced waste of materials can be gained by creating a preliminary hot forged component, from which the rotor can be formed by materials removal processes. A suitable material, such as Cobalt Iron, may be hot forged to form a pre-machined blank for a rotor 1, such that there is very little material waste created in producing the device by subsequent material removal processes. This hot forging process requires heating the material to a high temperature and forging it into at least the approximate shape of the rotor 1 before allowing it to cool. This process is further beneficial, because hot working of the material is already beneficial in providing the material with the requisite magnetic properties. As such, the steps can be combined to enable the material to be provided with desirable magnetic properties and the correct shape for manufacture of the component, simultaneously.

Either by the initial hot forging process or by further machining, the rotor 1 can be modified to introduce the variable shaft diameter, attachment portions and/or chamfered interfaces 14. Further features, such as coolant distribution channels may also be machined into the rotor 1.

It is to be appreciated that rotors in accordance with the present invention may be VFGs, VFSGs or any other type of electric machine.

The above embodiments describe one way of implementing the present invention. It will be appreciated that modifications of the features of the above embodiments are possible within the scope of the independent claims. For example, the methods described herein may be applied to any kind of electric machine. The features of the VFSG described herein are for example only and should not be seen as limiting to the claimed invention.

Features of the present invention are defined in the appended claims. While particular combinations of features have been presented in the claims, it will be appreciated that other combinations, such as those provided above, may be used.

The invention claimed is:

1. An electric machine for an aircraft, comprising:
    a stator; and
    a rotor, rotatably journaled to rotate about a rotation axis within the stator, the rotor comprising:
        a hollow tube forming a shaft portion;

a core pack portion, comprising a plurality of poles disposed around the shaft portion; and a back iron portion, configured to provide a path for magnetic flux to flow between adjacent poles of the core pack portion, the back iron portion being at least partially formed by the shaft portion, wherein the shaft portion comprises at least one shaft end which extends axially beyond the core pack portion, and wherein the shaft portion, the core pack portion and the back iron portion comprise a soft magnetic material, and wherein an internal diameter of the shaft portion is reduced in a back iron region which is longitudinally aligned, along the rotation axis, with the core pack portion.

2. The electric machine as defined in claim 1, wherein the shaft portion, the core pack portion and the back iron portion each comprise a material with a saturation magnetic flux density greater than 1.8 T.

3. The electric machine as defined in claim 1, wherein the hollow tube comprises an internal diameter and an external diameter.

4. The electric machine as defined in claim 3, wherein the back iron region is of an equal axial length to the core pack portion.

5. The electric machine as defined in claim 4, wherein an interface between the reduced internal diameter of the back iron region and a region of increased internal diameter is chamfered.

6. The electric machine as defined in claim 3, wherein the internal diameter of the shaft portion at the at least one shaft end is increased relative to the internal diameter in a region of the core portion.

7. The electric machine as defined in claim 1, wherein the shaft portion, the core pack portion and the back iron portion are a unitary part.

8. The electric machine as defined in claim 1, wherein the shaft portion, the core pack portion and the back iron portion are formed of two or more separate parts.

9. The electric machine as defined in claim 1, wherein at least one of the shaft portion, the core pack portion and the back iron portion are made from Cobalt Iron.

10. The electric machine as defined in claim 1, wherein each of the plurality of poles comprises a chamfered edge at a base of the pole and between respective poles.

11. The electric machine as defined in claim 1, wherein the shaft portion, the core pack portion and the back iron portion each comprise a material with a saturation magnetic flux density greater than 2 T.

12. A method of manufacturing a rotor for an electric machine for an aircraft, the method comprising the steps of:
providing a hollow tube forming a shaft portion;
providing a core pack portion, comprising a plurality of poles;
providing a back iron portion;
wherein an internal diameter of the shaft portion is reduced in a back iron region which is longitudinally aligned, along a rotation axis, with the core pack portion; and
assembling the rotor such that the core pack portion and the back iron portion are disposed around the shaft portion, and the back iron portion and the shaft portion provide a path for magnetic flux to flow between adjacent poles of the core pack portion;
wherein each of the shaft portion, the core pack portion and the back iron portion comprise a soft magnetic material.

13. A method of manufacturing a rotor for an electric machine for an aircraft, the method comprising the steps of:
providing a unitary soft magnetic material having a core pack portion with a first external diameter and a shaft portion with a second external diameter, the first external diameter being greater than the second external diameter; and
providing at least one rotor feature by performing a material removal process upon the unitary soft magnetic material such that the core pack portion, a back iron portion, and the shaft portion are formed of the unitary soft magnetic material;
wherein the back iron portion is configured to provide a path for magnetic flux to flow between adjacent poles of the core pack portion and is at least partially formed by the shaft portion.

14. The method of manufacturing a rotor, as defined in claim 13, wherein the material removal process is performed such that the unitary soft magnetic material in at least a part of the shaft portion is shaped as a hollow tube.

15. The method of manufacturing a rotor, as defined in claim 14, further comprising making the internal diameter at the shaft portion greater than the internal diameter at the core pack portion.

16. The method of manufacturing a rotor, as defined in claim 13, wherein the method further comprises:
performing a material removal process upon the unitary soft magnetic material in order to form a chamfer at a boundary between the first external diameter and the second external diameter.

17. The method of manufacturing a rotor, as defined in claim 13, wherein the method further comprises:
performing a material removal process upon the core pack portion to define a plurality of poles, each pole comprising a pole tip and, preferably, a pole tip overhang.

18. The method of manufacturing a rotor, as defined in claim 17, wherein the method further comprises:
performing a material removal process upon the core pack portion in order to form an attachment portion between adjacent poles.

* * * * *